N. T. ALLEN.
Thrashing Machine.
No. 8,157.
2 Sheets—Sheet 1.
Patented June 10, 1851.
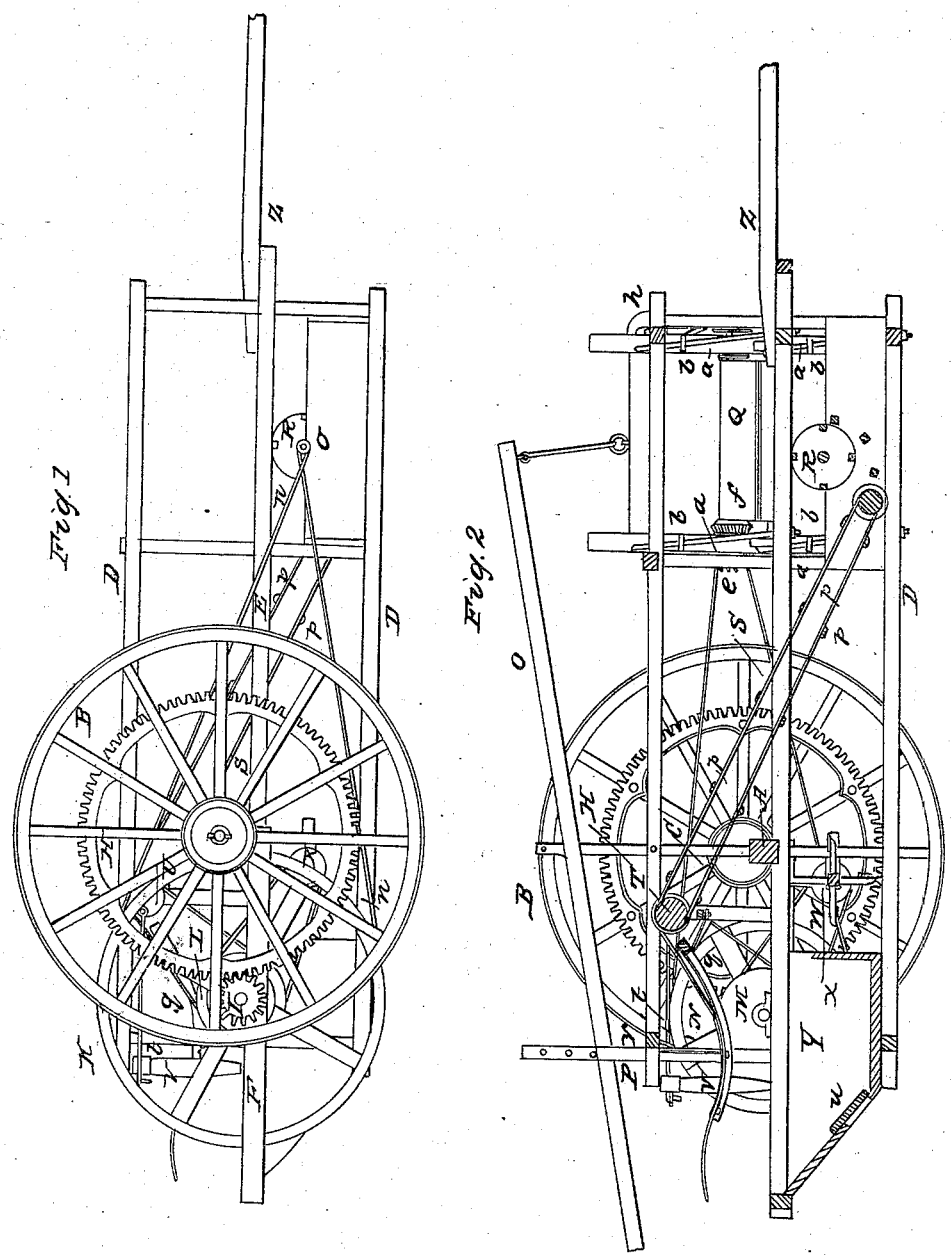

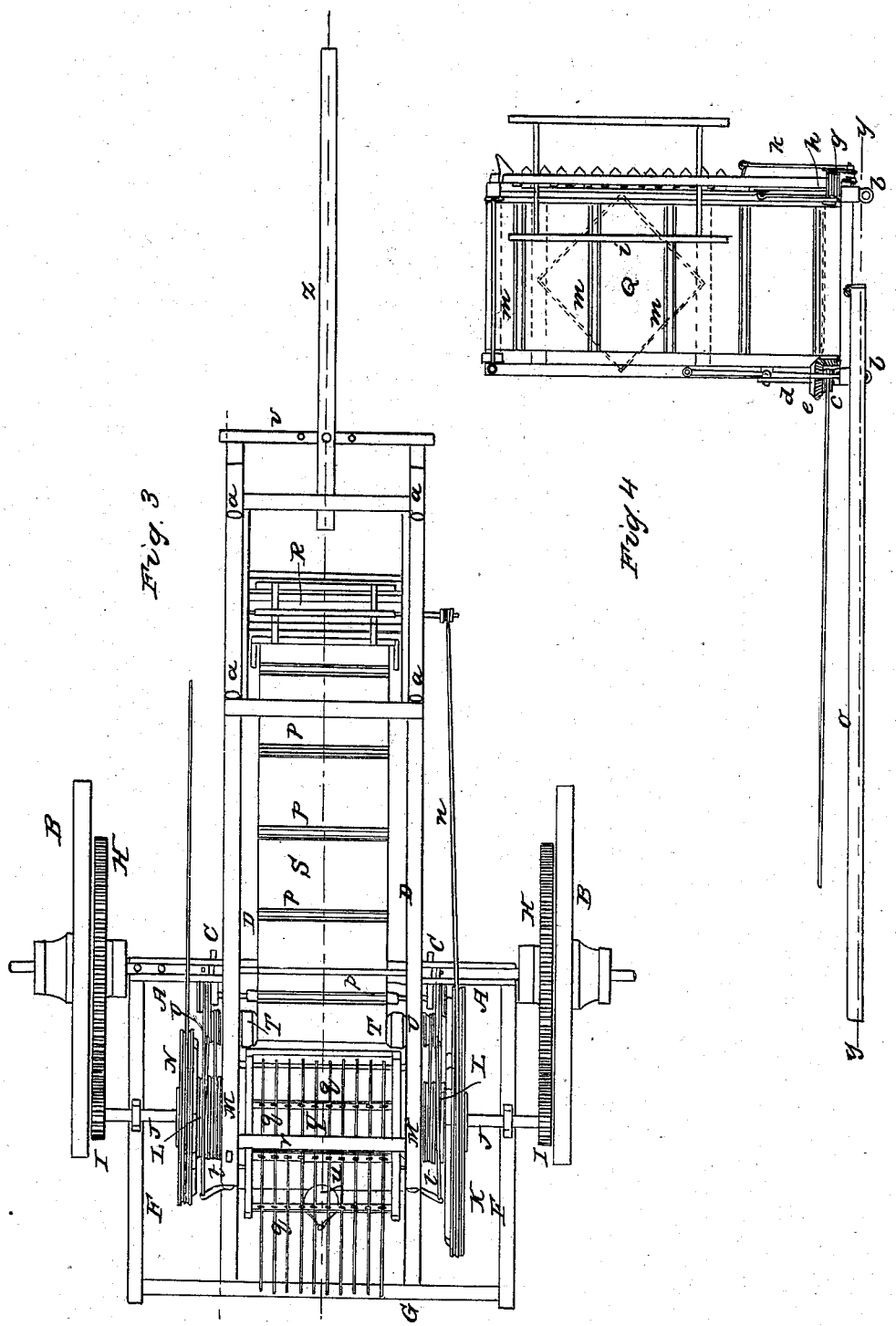

UNITED STATES PATENT OFFICE.

N. T. ALLEN, OF LUDLOWVILLE, NEW YORK.

IMPROVEMENT IN GRAIN-HARVESTERS.

Specification forming part of Letters Patent No. 8,157, dated June 10, 1851.

*To all whom it may concern:*

Be it known that I, NICHOLAS T. ALLEN, of Ludlowville, in the county of Tompkins and State of New York, have invented a new and useful Improvement in Harvesting-Machines; and I do hereby declare the following to be a full, clear, and exact description of the same, reference being had to the accompanying drawings, making a part thereof, in which—

Figure 1 represents a side view. Fig. 2 represents a vertical longitudinal section through the red line $x\ x$ of Fig. 3. Fig. 3 represents a top view with the cutters and endless-apron platform which cuts, receives, and carries the grain to the thrashing-cylinder removed; and Fig. 4 represents the platform carrying the cutters and endless apron, and which is attached to the red line $y$ of Fig. 3.

Similar letters in the several figures represent the same parts.

The nature of my invention consists—

First. In so arranging the platform carrying the cutters as that said platform can be raised or lowered for cutting less or more of the straw, and for passing over stumps, stones, or other obstructions, and at the same time keep the belt which drives the reel, knives, and endless apron always taut and at the same degree of tension.

Second. Gearing the machine to both the carrying-wheels upon which it is supported, and arranging the separating and cleaning apparatus in such manner as that it may be driven by either wheel, thus equalizing and adjusting the amount of friction upon each, which makes the machine much more manageable and easy to be guided and controlled. It is well known that in the morning and evening, when the grain or straw is damp, it is much more easily cut, but much more difficult to thrash. In the middle of the day, when dry, it is just the reverse. These changes during the day make it impossible to so construct a machine permanently as that it will obviate the difficulty which arises in having the line of draft out of the line of resistance, particularly when that line is constantly varying. By my arrangement I have overcome this difficulty.

Third. So balancing the various parts of the machine upon one axle and one pair of wheels as to dispense with supporting-wheels in front or rear, and which allows the harvester to be more easily turned without injuring the standing grain.

To enable others skilled in the art to make and use my invention, I will proceed to describe the same with reference to the drawings.

Through an axle, A, supported upon the wheels B, are passed the standards C, to which are bolted the top and bottom longitudinal pieces, D, of the main frame, the one being above and the other below the axle A. The middle longitudinal pieces, E, of the main frame are bolted to the under side of the axle, and these longitudinal pieces extend forward of and project in rear of said axle sufficiently far to receive and support the various parts of the machine, to be hereinafter described, so as to balance the weight equally on the axle. The longitudinal pieces (which are the same on both sides of the machine) are firmly secured together by ties at top and bottom, and by ribs passing from one to the other on the sides, so as to make a firm and substantial frame, and in a manner well known to mechanicians.

In rear of the axle A, and outside of the frame above described, is another frame, the sides F of which are framed into the axle at one end, and into the cross-piece G at the other end, and into which cross-piece, also, the middle longitudinal pieces, E, of the inner frame are secured by mortise and tenon. Upon these frames the whole machine is arranged and supported.

To the inner side of the supporting-wheels B are secured the driving cog-wheels H, which mesh into spur-wheels I on a shaft, J, which has its bearings on top of the side pieces, F, of the frame, in rear of the axle. Upon the shaft J, aforesaid, are arranged the driving-pulleys K L M N, the use of each one of which will be hereinafter described.

The platform, Fig. 4, carrying the cutters, &c., is made of suitable size, firmly framed together, and is hung to the forward part of the main frame, on one side thereof, by means of the inclined guide-rods $a$, Fig. 2, which pass through the dead-eyes $b$ on the end of said platform, and by means of which dead-eyes and inclined rods $a$ said platform may be raised or lowered by means of the lever O, and held in place by pins in the standard P, in rear of the machine, in convenient position for the operator. The inclined guide-rods $a$, Fig. 2, form a line parallel to the tangent of a circle, the radius of which would be the distance between the center of the pulley-wheel N and the center of the pulley $c$ on the shaft $d$, so that in raising or lowering the platform, although it does not move in the arc of a circle, it is sufficiently near to keep the driving-belt which passes from the pulley-wheel N to the pulley c equally strained in any position.

The pulley c, Fig. 4, is cast onto and forms a part of the bevel-gear e, which is secured to the shaft d, said shaft being supported in proper bearings in the frame or platform. The bevel-gear e meshes into a similar bevel-gear, f, arranged on a shaft extending toward the front of the platform, and over and by which shaft the endless apron for carrying the grain cut into the thrashing apparatus passes and is operated. On the end of this shaft, at the front of the machine, is a pulley, g, over which runs a belt which passes to and over a pulley, h, on the end of the shaft s, upon which is placed the reel i for drawing up the grain to the cutters, and throwing it, when cut, onto the endless apron Q, to be carried to the thrasher. To a wrist-pin in the pulley g is fastened one end of a pitman, k, the other end being secured to an arm, l, on the plate of knives, and which gives a vibrating motion to the knives or cutters when the machine is moving. The knives rest and move upon fingers which are immediately underneath them, and between which the grain is held firmly while being cut. The endless apron Q passes around shafts at each end of the platform, (one of which, as before described, drives it,) and is provided with lags m for holding and carrying the grain to thrasher (to be hereinafter described) and for spreading the apron.

In the front part of the main frame, and directly opposite the line of the endless apron Q, is placed the thrashing-cylinder R, properly supported by its journals in boxes arranged on the frame, and rotating over a concave which may be formed (as well as the cylinder) in any of the well-known ways of constructing thrashers; and to insure a proper delivery of the material cut and carried to the thrasher a hopper may be arranged over said thrashing-cylinder, into which the grain may fall and be conducted to the cylinder. Motion is communicated to the thrashing-cylinder by means of a belt, n, which passes over the pulley-wheel K, and over a pulley, o, on the shaft of the thrashing-cylinder.

An inclined endless apron, S, extends from a point below the thrashing-concave up and over a roller or shaft, T, near the top of the machine and just in rear of the line of the axle, which apron is provided with lags p for supporting and carrying up the material thrashed, to be deposited in the shaker or screen q, which is suspended by cords to the end cross-piece, r, in the top of the main frame. Motion is communicated to the screen by means of a pitman, t, one end of which is secured to a wrist-pin in one of the pulleys U, which are arranged on each end of the shaft T, (which carries the endless apron S, and which said shaft may receive its motion from either of the pulleys M on the shaft J,) the other end of said pitman being hooked into a staple on a vertical roller, V, which is supported on journals on which it may freely play in the longitudinal pieces D E of the main frame of the machine.

Underneath the frame, and a little in rear of the axle, is arranged the fan-blower W, which is driven by a band passing around either of the pulleys L on the shaft J, and around a pulley, X, on either end of the shaft of said fan-blower. It will be perceived that the endless apron S, screen q, and fan-blower W may be driven from either side of the machine, or from either master cog-wheel, so that when the grain is damp and difficult to thrash, the wheel driving the thrasher may be relieved from driving any of the other parts of the machine; and when the grain is dry, and easily thrashed, but hard to cut, the wheel driving the cutters may be relieved of its excess of resistance. By this means I am able to equalize and adjust the driving-power required from each wheel to suit the varied circumstances under which each operates, and by so equalizing the driving-power the machine is more easily guided and managed. I am also enabled to place the horses in front of the machine, and the line of draft or resistance directly in line with the moving-power, which has not heretofore been done in machines for a similar purpose.

The rear of the machine is provided with a box or receptacle, Y, for the grain to fall into when thrashed and cleaned, said receptacle being provided with a door, u, for drawing out the grain when filled.

Z is the tongue to which the horses are hitched, and which also may be adjusted to the line of draft by means of a bolt passing through holes in the front cross-bar, v; but this adjustment is only to a limited extent.

The points of the journals upon which the wheels B turn are provided with two sets of holes for the linchpins, so that when the machine is being removed to or from the field the pins are placed in the outer holes, and the inclination of the wheels draws them out against said pins, slipping the main cog-wheels H out of gear. This, however, may be done in any other well-known manner.

The machine as here represented is also braced by iron straps and rods, which are fully shown in the drawings, but not described, as they constitute no part of my invention, and may be varied to suit circumstances.

Having thus fully described my invention, what I claim therein as new, and desire to secure by Letters Patent, is—

Gearing the operating parts of the machine from both the wheels, in combination with the arrangement by which portions may be driven by either, so as to equalize the driving-power upon each, and thus to allow the machine to be much more easily guided and controlled.

N. T. ALLEN.

Witnesses:
  T. C. DONN,
  A. B. STOUGHTON.